United States Patent [19]

Kuroda

[11] Patent Number: 5,309,441
[45] Date of Patent: May 3, 1994

[54] COMPACT DEVICE FOR CARRYING OUT TERMINATING PROCESSING OF STS-N SIGNAL

[75] Inventor: Yoshihide Kuroda, Tokyo, Japan
[73] Assignee: NEC Corporation, Tokyo, Japan
[21] Appl. No.: 47,427
[22] Filed: Apr. 15, 1993
[30] Foreign Application Priority Data
Apr. 15, 1992 [JP] Japan .................................. 4-095101
[51] Int. Cl.[5] ............................................ H04J 14/08
[52] U.S. Cl. .............................. 370/105.2; 370/110.1; 370/112
[58] Field of Search ................ 370/105.1, 105.2, 105.4, 370/106, 110.1, 112; 359/135

[56] References Cited
U.S. PATENT DOCUMENTS
4,998,242 3/1991 Upp .................................. 370/112 X
5,134,614 7/1992 Baydar et al. ................. 370/110.1 X
5,136,587 8/1992 Obana et al. ......................... 370/112

Primary Examiner—Douglas W. Olms
Assistant Examiner—Melvin Marcelo
Attorney, Agent, or Firm—Sughrue, Mion, Zinn, Macpeak & Seas

[57] ABSTRACT

On terminating processing of an STS-N signal into which first through N-th STS-1 signals identified by first through N-th channel numbers are multiplexed, a channel counter counts up from a first value to an N-th value in response to leading bytes of SPE's of the STS-1 signals in the STS-N signal. Responsive to control bytes following the leading bytes in the STS-N signal, the counter repeats the above-mentioned operation and produces a count signal successively representing the first through the N-th values as the first through the N-th channel numbers. A data processor processes the STS-N signal. First through N-th FIFO's correspond to the first through the N-th channel numbers. Responsive to the count signal, a distributor distributes an output of the processor at every one byte to the FIFO's corresponding to the channel numbers represented by the first through N-th values successively indicated by the count signal.

4 Claims, 12 Drawing Sheets

COMPACT DEVICE FOR CARRYING OUT TERMINATING PROCESSING OF STS-N SIGNAL

BACKGROUND OF THE INVENTION

This invention relates to a terminating device for carrying out a terminating processing of an STS-N signal (namely, a synchronous transport signal level N).

The STS-N signal is a multiplexed signal given by synchronously time division multiplexing first through N-th STS-1 signals at every one byte, where N represents a predetermined integer greater than one. Each STS-1 signal (namely, a synchronous transport signal level 1 has a bit rate of 51.480 Mbits/s. The first through the N-th STS-1 signals are identified by first through N-th channel numbers, respectively. Each of the first through the N-th STS-1 signals comprises a synchronous payload envelope comprising a leading byte representative of predetermined data and a predetermined plural number J of control bytes representative of control information data used in the device in carrying out the terminating processing.

A conventional terminating device comprises a demultiplexer for demultiplexing the STS-N signal into the first through the N-th STS-1 signals in order to carry out the terminating processing individually for the first through the N-th STS-1 signals. Therefore, various pulse generators, each equal in number to N, are necessary individually for the first through the N-th STS-1 signals. In addition, first through N-th data processors are necessary in processing the control information data.

As a consequence, the conventional terminating device is bulky and expensive.

SUMMARY OF THE INVENTION

It is therefore an object of this invention to provide a terminating device which is compact.

It is another object of this invention to provide a terminating device of the type described, which device is inexpensive.

Other objects of this invention will become clear as the description proceeds.

On setting forth the gist of this invention, it is possible to understand that a terminating device is for carrying out a terminating processing of an STS-N signal which is a multiplexed signal given by synchronously time division multiplexing first through N-th STS-1 signals at every one byte, where N represents a predetermined integer greater than one. The first through the N-th STS-1 signals are identified by first through N-th channel numbers, respectively. Each of the first through the N-th STS-1 signals comprises a synchronous payload envelope comprising a leading byte representative of predetermined data and a predetermined plural number J of control bytes following the leading byte and representing control information data used in the device in carrying out the terminating processing.

According to this invention, the above-understood terminating device comprises: a clock pulse generator supplied with the STS-N signal for successively generating clock pulses in byte synchronism with the leading bytes of the synchronous payload envelopes of the first through the N-th STS-1 signals and the contact bytes of the synchronous payload envelopes of the first through the N-th STS-1 signals; a leading byte indication signal generator supplied with the STS-N signal for generating a leading byte indication signal for collectively indicating the leading bytes of the synchronous payload envelopes of the first through the N-th STS-1 signals by detecting the predetermined data of the leading bytes of the synchronous payload envelopes of the first through the N-th STS-1 signals from the STS-N signal; a channel counter connected to the clock pulse generator and the leading byte indication signal generator for carrying out a counting operation of counting up a count from a first counted value to an N-th counted value in response to the clock pulses received while the channel counter receives the leading byte indication signal, the channel counter repeatedly carrying out the counting operation of counting up the count from the first counted value to the N-th counted value in response to the clock pulses received when the channel counter does not receive the leading byte indication signal, the channel counter repeatedly producing a channel count signal successively representing, as said first through said N-th channel numbers, the first through the N-th counted values which are counted in response to the clock pulses received when the channel counter does not receive the leading byte indication signal; a data processor supplied with the STS-N signal and connected to the clock pulse generator and the leading byte indication signal generator for successively producing the control bytes of the synchronous payload envelopes of the first through the N-th STS-1 signals in response to the clock pulses received when the data processor does not receive the leading byte indication signal; first through N-th first-in first-out memories which are in one-to-one correspondence to the first through the N-th channel numbers; and a distributor connected to the data processor and the first through the N-th first-in first-out memories for repeatedly carrying out, in response to the channel count signal repeatedly produced by the channel counter, a distributing operation of distributing the control bytes of the synchronous payload envelopes of the first through the N-th STS-1 signals at every one byte to the first through the N-th first-in first-out memories corresponding to the first through the N-th channel numbers successively represented by the channel count signal. The distributor thereby makes the first through the N-th first-in first-out memories memorize the control bytes of the synchronous payload envelopes of the first through the N-th STS-1 signals as first through N-th memorized data signals of the first through the N-th STS-1 signals, respectively.

DESCRIPTION OF THE PREFERRED EMBODIMENT

Figure 1:
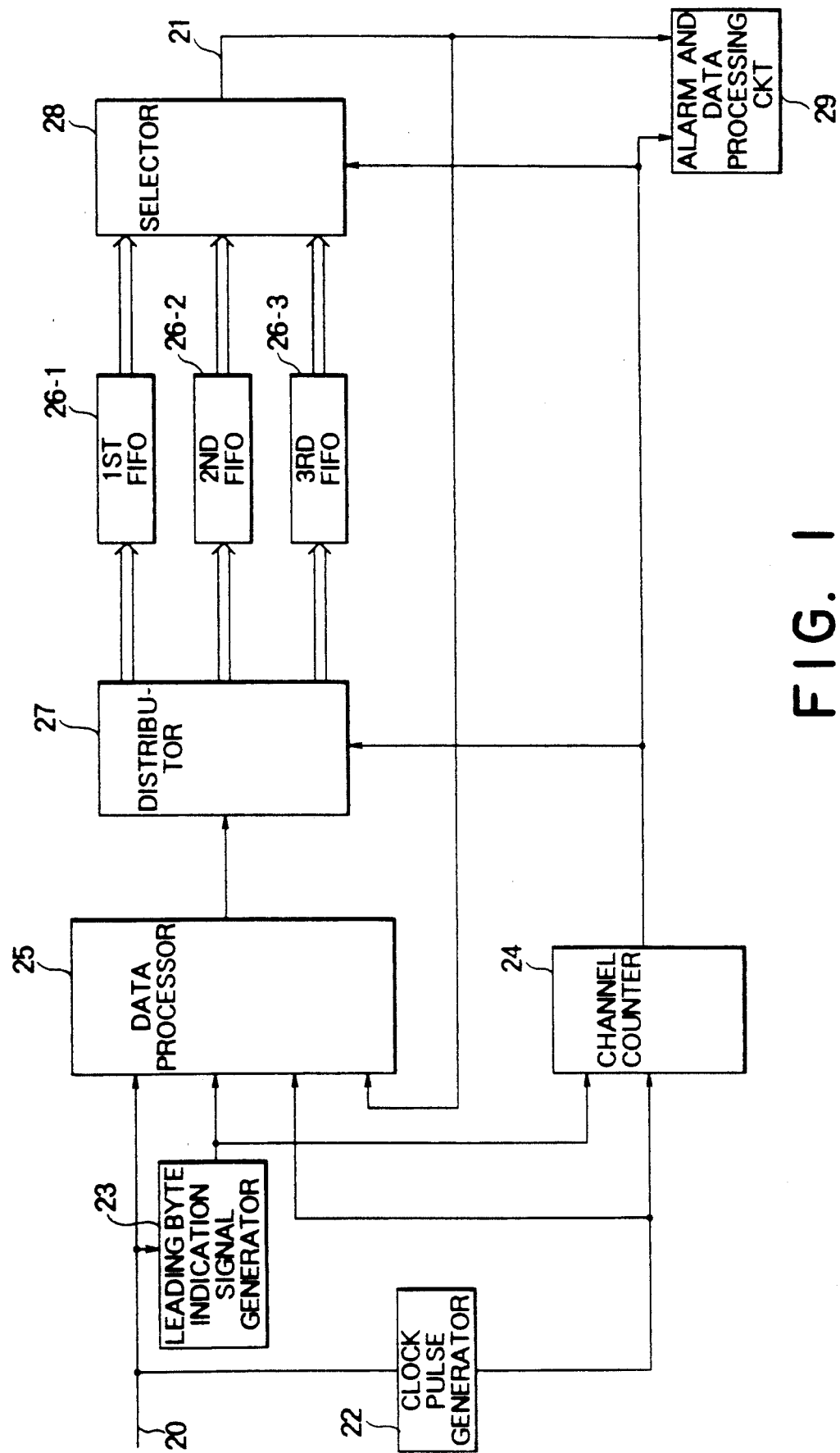
FIG. 1 is a block diagram of a terminating device according to an embodiment of this invention.

Referring to FIG. 1, a terminating device according to an embodiment of this invention is for carrying out a terminating processing of an STS-N signal 20 to produce a processed signal 21. The STS-N signal 20 is a multiplexed signal given by synchronously time division multiplexing first through N-th STS-1 signals at every one byte, where N represents a predetermined integer greater than one. That is, the STS-N signal 20 is given by octet multiplexing the first through the N-th STS-1 signals. The first through the N-th STS-1 signals are identified by first through N-th channel numbers, respectively.

Figure 2:
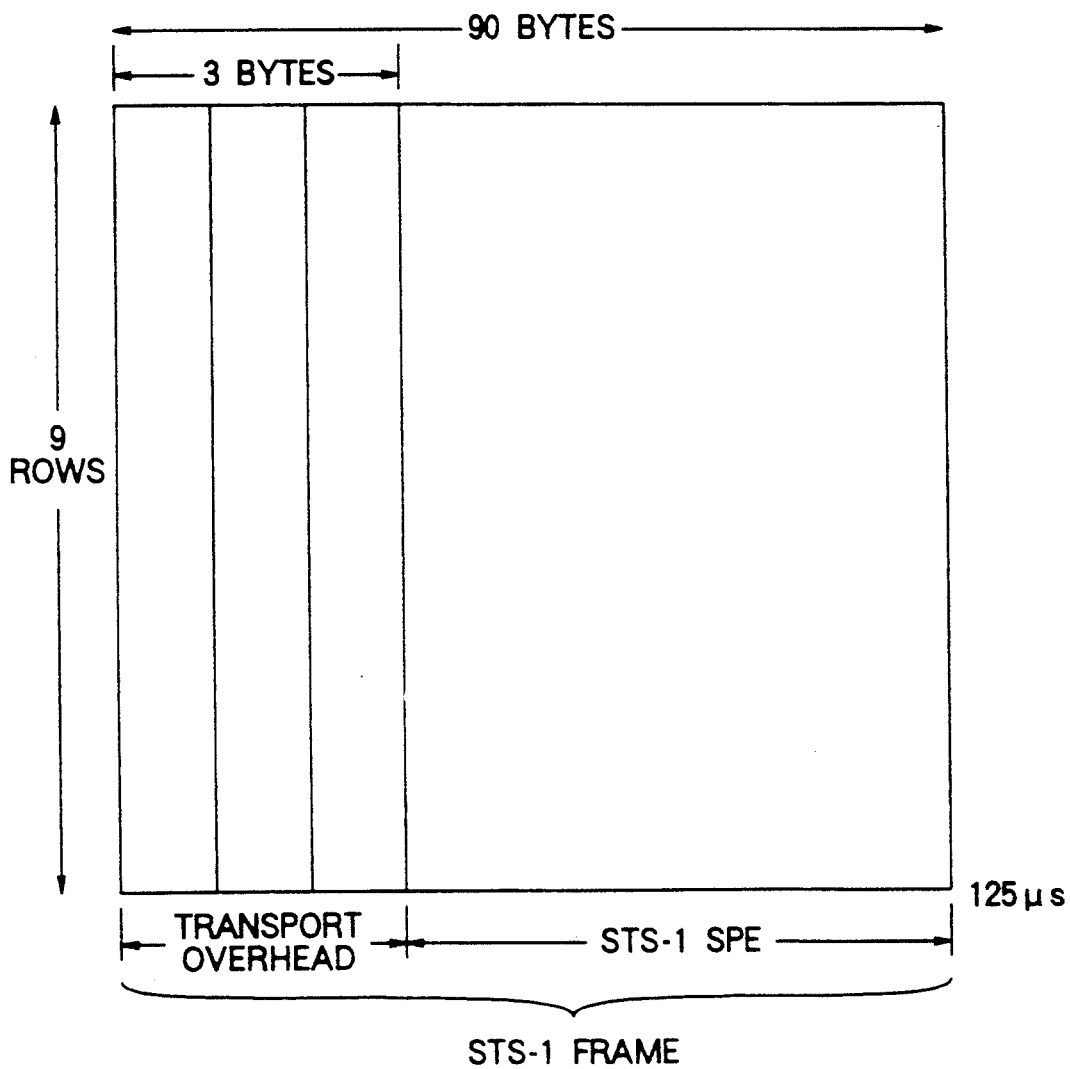
FIG. 2 is a diagram for use in describing a structure of a frame of an STS-1 signal.

Turning to FIG. 2, each of the first through the N-th STS-1 signals has a bit rate of 51.480 Mbits/s and comprises an STS-1 frame comprising first through ninth rows, each of which comprises first through ninetieth bytes (octets) or columns. Each byte consists of eight bits. First through third bytes of the first through the ninth rows serve as a transport overhead known in the art. Remaining bytes (that is, fourth through ninetieth bytes) of the first through the ninth rows serve as a synchronous payload envelope (STS-1 SPE). Each STS-1 signal has a frame length of 125 μs.

Figure 3:
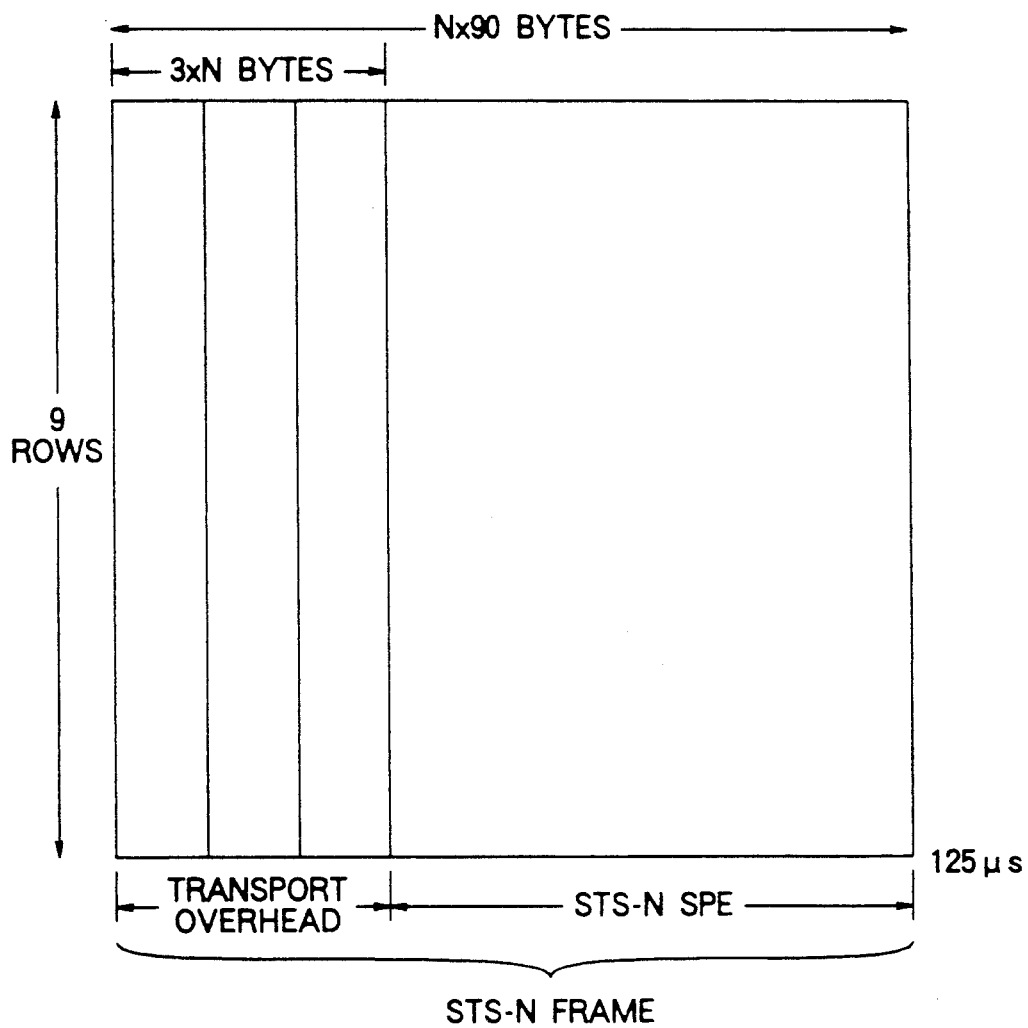
FIG. 3 is a diagram for use in describing a structure of a frame of an STS-N signal.

Turning to FIG. 3, the STS-N signal comprises an STS-N frame comprising first through ninth rows, each of which comprises first through (90×N)-th bytes. The STS-N signal has a bit rate of 51.480×N Mbits/s.

Figure 4:
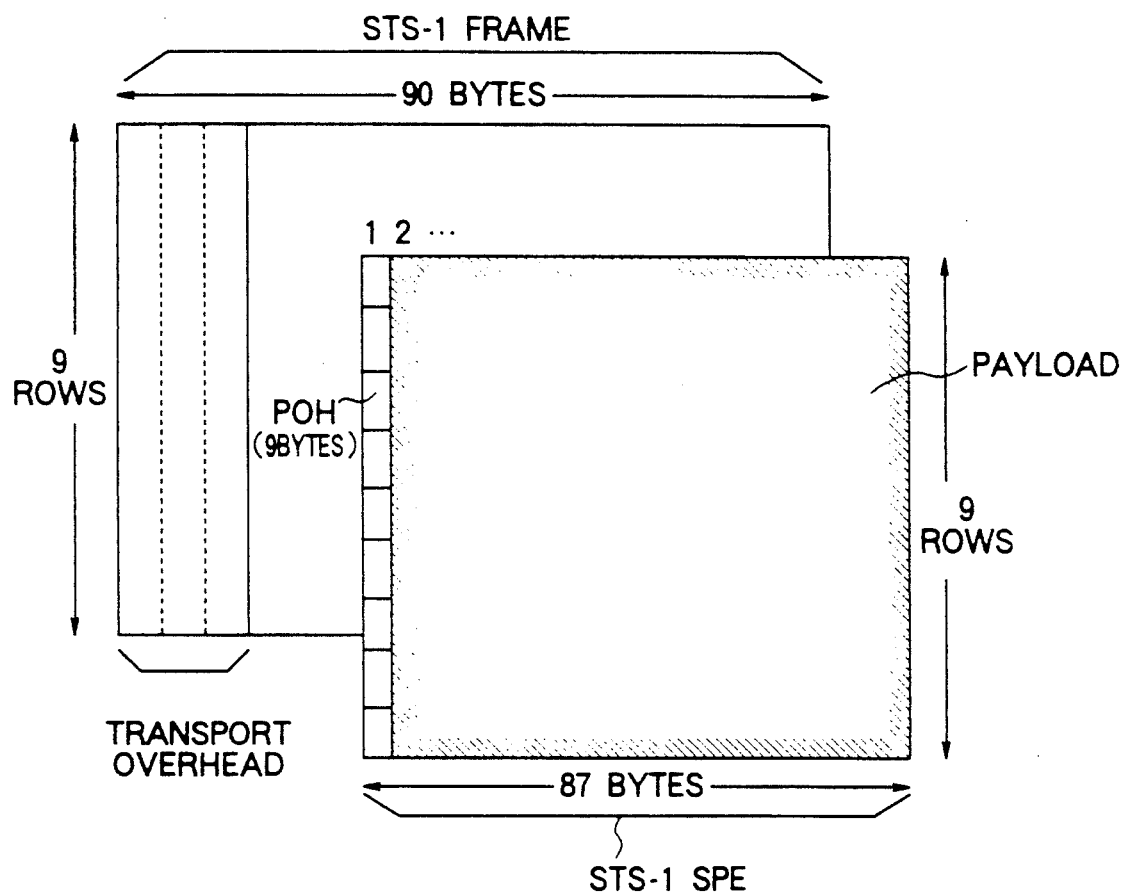
FIG. 4 is a diagram for use in describing a structure of a synchronous payload envelope of a frame of the STS-1 signal.

Turning to FIG. 4, the synchronous payload envelope (STS-1 SPE) comprises first through ninth subframes, each of which comprises a path overhead (POH) at a first column or byte of the synchronous payload envelope (STS-1 SPE) and a payload at second through eighty-seventh columns or bytes. Data are transferred by a VT (virtual tributary) of size X defined in the synchronous payload envelope (STS-1 SPE). The VT of size 1.5 has a bit rate of 1.728 Mbits/s. The VT of size 2 has a bit rate of 2.304 Mbits/s. The VT of size 3 has a bit rate of 3.456 Mbits/s. The VT of size 6 has a bit rate of 6.912 Mbits/s.

Figure 5:
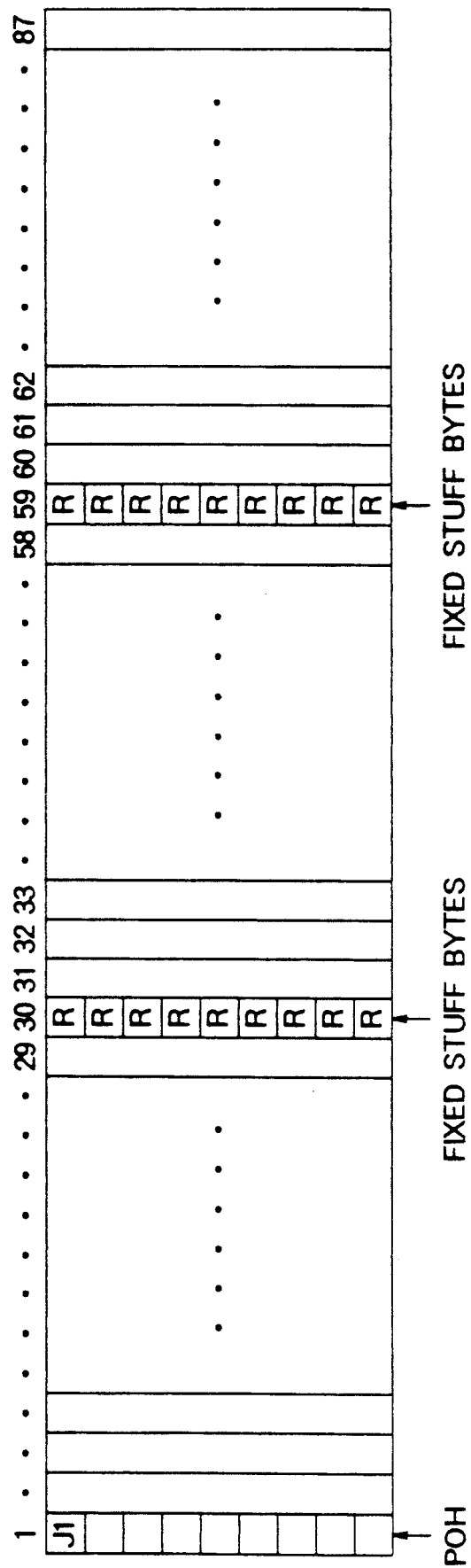
FIG. 5 is a diagram for use in describing a structure of the synchronous payload envelope.

Turning to FIG. 5, the synchronous payload envelope (STS-1 SPE) is divided into three blocks each including 29 columns or bytes in order for data to be accommodated efficiently in the synchronous payload envelope (STS-1 SPE). Fixed stuff bytes (R) are formed by one column and are inserted into the thirtieth and fifty-ninth columns. Data are accommodated into 84 columns of the blocks except for the POH and two units of the fixed stuff bytes (R) in accordance with the size x of the VT in the following.

Figure 6:
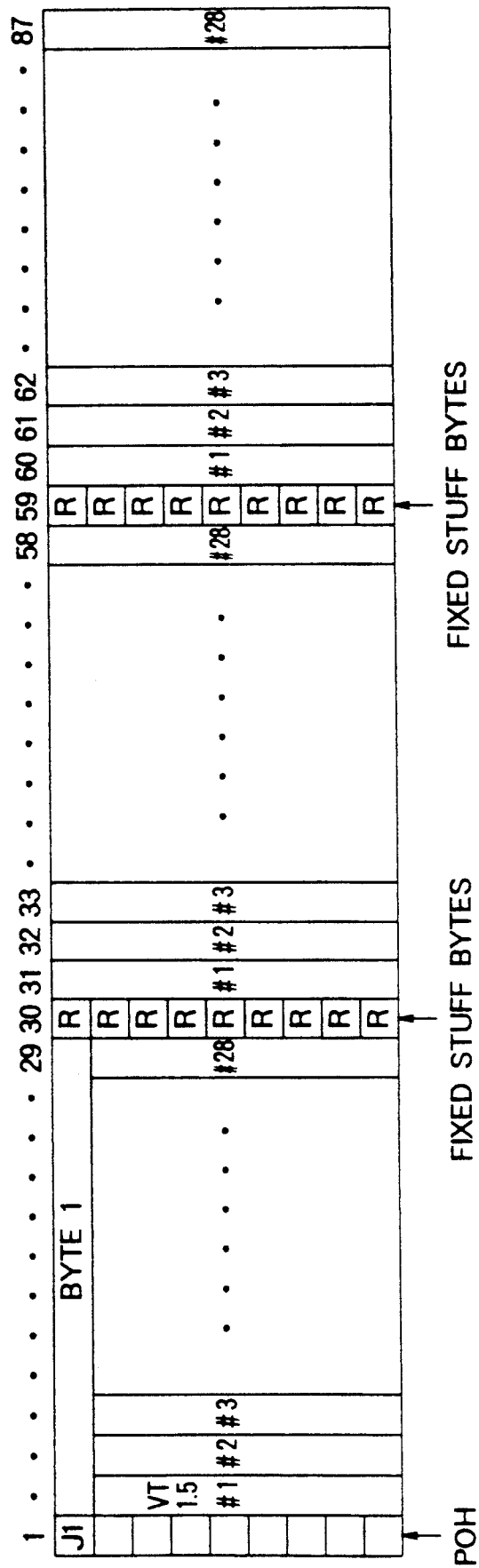
FIG. 6 is a diagram for use in describing a structure of VT's of size 1.5 which are accommodated in the synchronous payload envelope.

Turning to FIG. 6, first through twenty-eighth VT's #1 to #28 of size 1.5 are accommodated in the synchronous payload envelope. For example, the first VT #1 is accommodated in the second, the thirty-first, and the sixtieth columns. The twenty-eighth VT #28 is accommodated in the twenty-ninth, fifty-ninth, and the eighty-seventh columns.

Attention will be directed to the first subframe of the synchronous payload envelope. The subframe comprises a leading byte J1 allocated as a path trace part of the path overhead POH as known in the art. The leading byte is representative of predetermined data. A predetermined plural number J of control bytes, labelled "Byte 1", follow the leading byte J1 in the first subframe of the synchronous payload envelope. In the illustrated control bytes "Byte 1", J is equal to 28 corresponding to the number of the VT's of size 1.5 accommodated in the synchronous payload envelope. In other words, the control bytes are the first bytes of the first through the twenty-eighth VT's #1 to #28 of size 1.5. The control bytes are representative of control information data used in the terminating device in carrying out the terminating processing. The control information data used in the terminating device in carrying out the terminating processing. The control information data is, for example, alarm control information data or an alarm indication signal (AIS).

Figure 7:
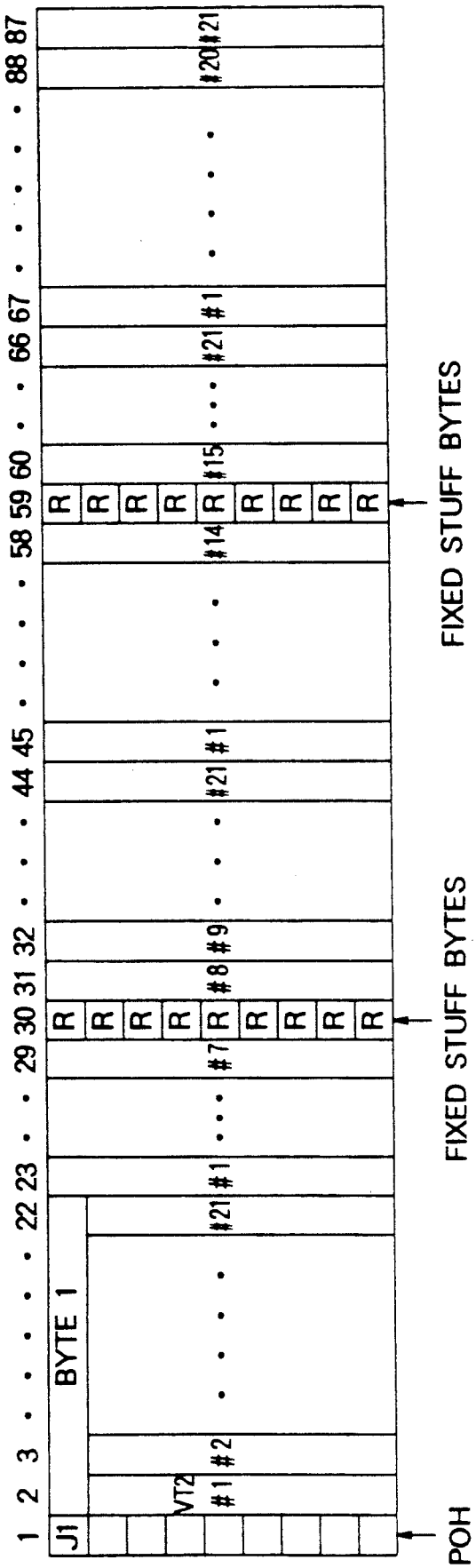
FIG. 7 is a diagram for use in describing a structure of VT's of size 2 which are accommodated in the synchronous payload envelope.

Turning to FIG. 7, first through twenty-first VT'#1 to #21 of size 2 are accommodated in the synchronous payload envelope. For example, the first VT #1 is accommodated in the second, the twenty-third, the forth-fifth, and the sixty-seventh columns. Likewise, the twenty-first VT #21 is accommodated in the twenty-second, the forty-fourth, the sixty-sixth, and the eighty-seventh columns.

A predetermined plural number J of the control bytes "Byte 1" succeed the leading byte J1 in the synchronous payload envelope. In this case, J is equal to 21.

Figure 8:
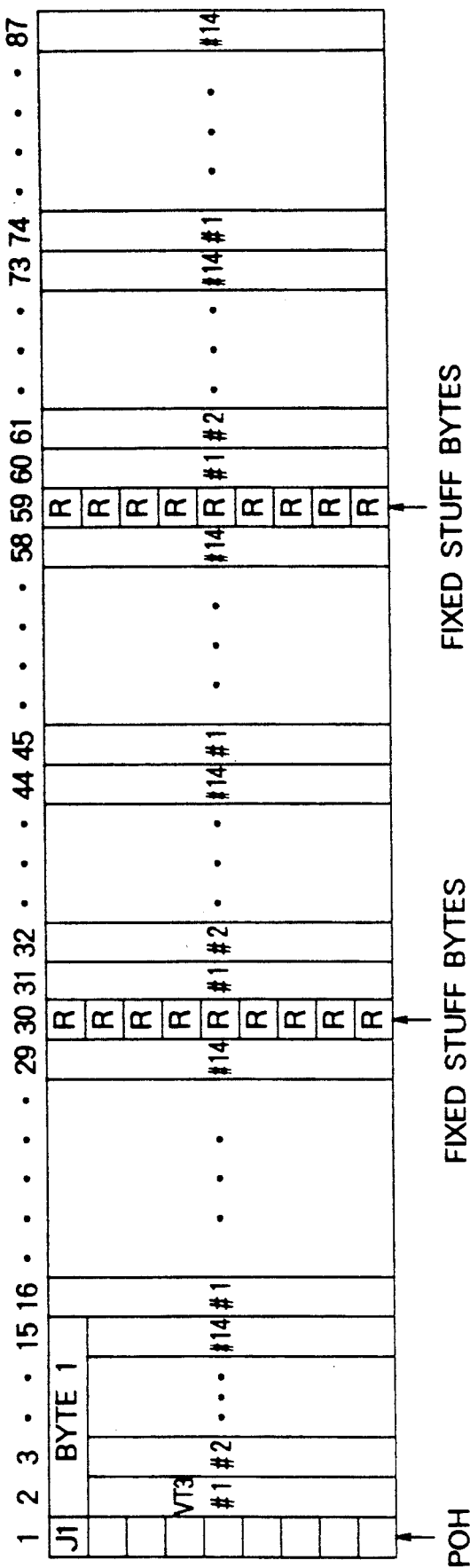
FIG. 8 is a diagram for use in describing a structure of VT's of size 3 which are accommodated in the synchronous payload envelope.

Turning to FIG. 8, first through fourteenth VT's #1 to #14 of size 3 are accommodated in the synchronous payload envelope. The first VT #1 is accommodated in the second, the sixteenth, the thirty-first, the forty-fifth, the sixtieth, and the seventy-fourth columns. Likewise, the fourteenth VT #14 is accommodated in the fifteenth, twenty-ninth, the forty-fourth, fifty-eighth, the seventy-third, and the eighty-seventh columns.

Inasmuch as the number of the VT's of size 3 accommodated in the synchronous payload envelope is fourteen, the number J of the control bytes "Byte 1" is also fourteen.

Figure 9:
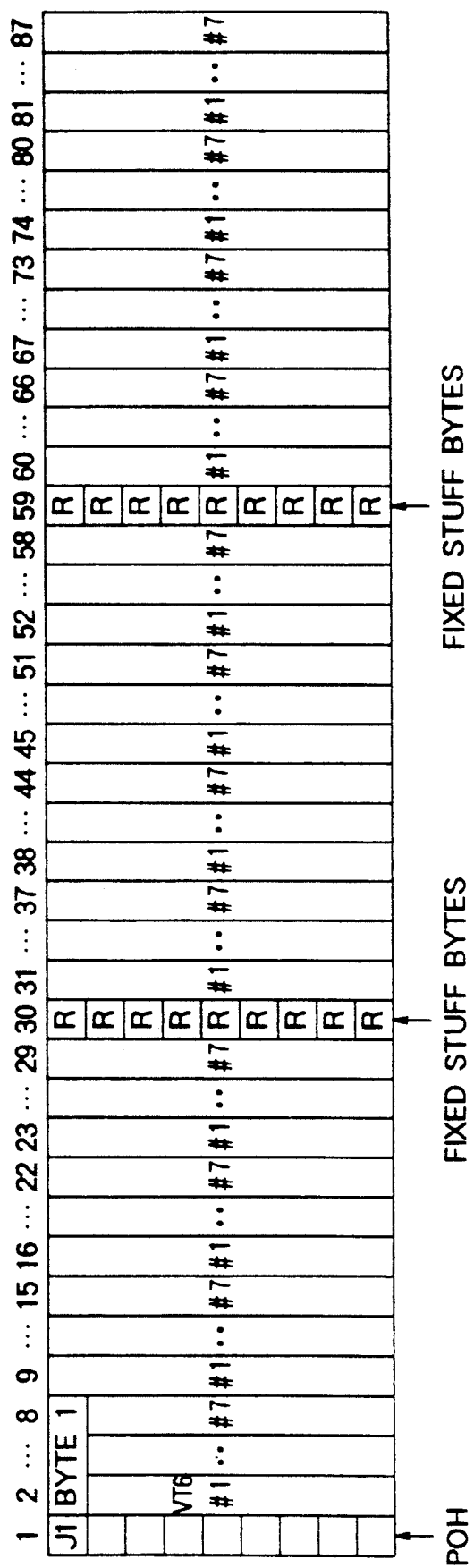
FIG. 9 is a diagram for use in describing a structure of VT's of size 6 which are accommodated in the synchronous payload envelope.

Turning to FIG. 9, first through seventh VT's #1 to #7 of size 6 are accommodated in the synchronous payload envelope. Inasmuch as the number of the VT's of size 6 accommodated in the synchronous payload envelope is seven, the number J of the control bytes "Byte 1" is seven.

Turning back to FIG. 1, the terminating device comprises a clock pulse generator 22 supplied with the STS-N signal 20. Merely for brevity of description, it will be assumed that the STS-N signal 20 is an STS-3 signal. That is, N is equal to 3. The STS-3 signal is given by octet or byte multiplexing first through third STS-1 signals identified by first through third channel numbers, respectively.

Figure 10:
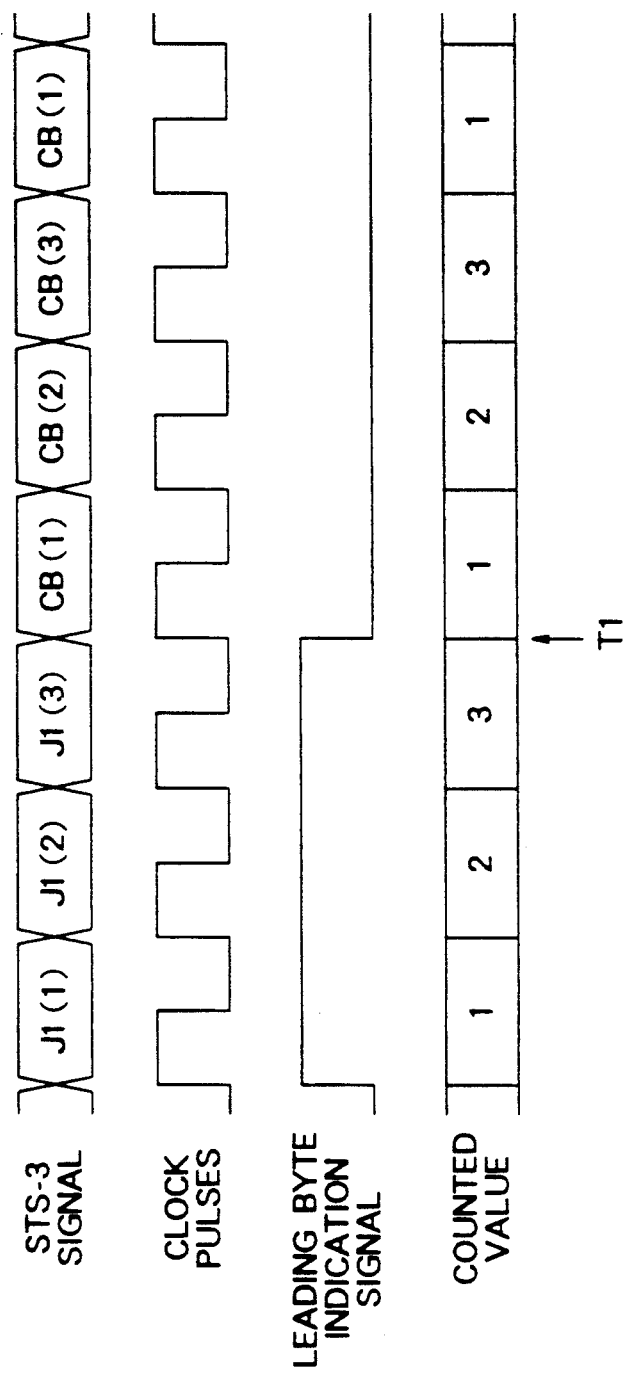
FIG. 10 is a time chart for use in describing operation of the terminating device illustrated in FIG. 1.

Turning to FIG. 10, the STS-3 signal is depicted along a top or first row and comprises leading bytes J1(1), J1(2), and J1(3) of the synchronous payload envelopes of the first through the third STS-1 signals, where (1), (2), and (3) represent the first through the third channel numbers for the first through the third STS-1 signals, respectively. The leading byte J1(3) is followed by the control bytes CB(1), CB(2), and CB(3) of the synchronous payload envelopes of the first through the third STS-1 signals.

With reference to FIGS. 1 and 10, the clock pulse generator 22 successively generates clock pulses in byte synchronism with the leading bytes J1(1), J1(2), and J1(3) of the synchronous payload envelopes of the first through the third STS-1 signals and the control bytes CB(1), CB(2), and CB(3) of the synchronous payload envelopes of the first through the third STS-1 signals. The clock pulsed is depicted along a second row in FIG. 10.

A leading byte indication signal generator 23 is supplied with the STS-3 signal 20. The leading byte indication signal generator 23 detects the predetermined data of the leading bytes J1(1), J1(2), and J1(3) of the synchronous payload envelopes of the first through the third STS-1 signals from the STS-3 signal 20. The leading byte indication signal generator 23 thereby generates a leading byte indication signal for collectively indicating the leading bytes J1(1), J1(2), and J1(3) of the synchronous payload envelopes of the first through the third STS-1 signals. The leading byte indication signal is illustrated along a third row in FIG. 10.

A channel counter 24 is connected to the clock pulse generator 22 and the leading byte indication signal generator 23. The channel counter 24 carries out a counting operation of counting up a count from a first counted value to a third counted value in response to the clock pulses received while the channel counter 24 receives the leading byte indication signal. As depicted along a fourth or bottom row in FIG. 10, the first counted value is 1, the second counted value being 2, the third counted value being 3.

Subsequently, the channel counter 24 repeatedly carries out the counting operation of counting up the count from the first counted value equal to 1 to the third counted value equal to 3 in response to the clock pulses received when the channel counter 24 does not receive the leading byte indication signal as indicated along the bottom row. The channel counter 24 repeatedly produces a channel count signal successively representing the first through the third counted values which are counted in response to the clock pulses received when the channel counter does not receive the leading byte indication signal and which represent the first through the third channel numbers, respectively. In other words, the counter 24 produces the channel count signal successively representing the first through the third counted values which are counted after a time instant T1.

A data processor 25 is supplied with the STS-3 signal 20 and connected to the clock pulse generator 22 and the leading byte indication signal generator 23. The data processor 25 successively produces the control bytes CB(1), CB(2), and CB(3) of the synchronous payload envelopes of the first through the third STS-1 signals in response to the clock pulses received when the data processor 25 does not receive the leading byte indication signal.

First through third first-in first-out memories (FIFO) 26-1 to 26-3 are in one-to-one correspondence to the first through the third channel numbers.

A distributor 27 is connected to the data processor 25 and the first through the third first-in first-out memories 26-1 to 26-3. In response to the channel count signal repeatedly produced by the channel counter 24, the distributor 27 repeatedly carries out a distributing operation of distributing the control bytes CB(1), CB(2), and CB(3) of the synchronous payload envelopes of the first through the third STS-1 signals at every one byte to the first through the third first-in first-out memories 26-1 to 26-3 corresponding to the first through the third channel numbers successively represented by the channel count signal.

The distributor 27 thereby makes the first through the third first-in first-out memories 26-1 to 26-3 memorize the control bytes CB(1), CB(2), and CB(3) of the synchronous payload envelopes of the first through the third STS-1 signals as first through third memorized data signals of the first through the third STS-1 signals, respectively. That is, the control bytes CB(1) are memorized in the first first-in first-out memory 26-1. The control bytes CB(3) are memorized in the third first-in first-out memory 26-3.

Figure 11:
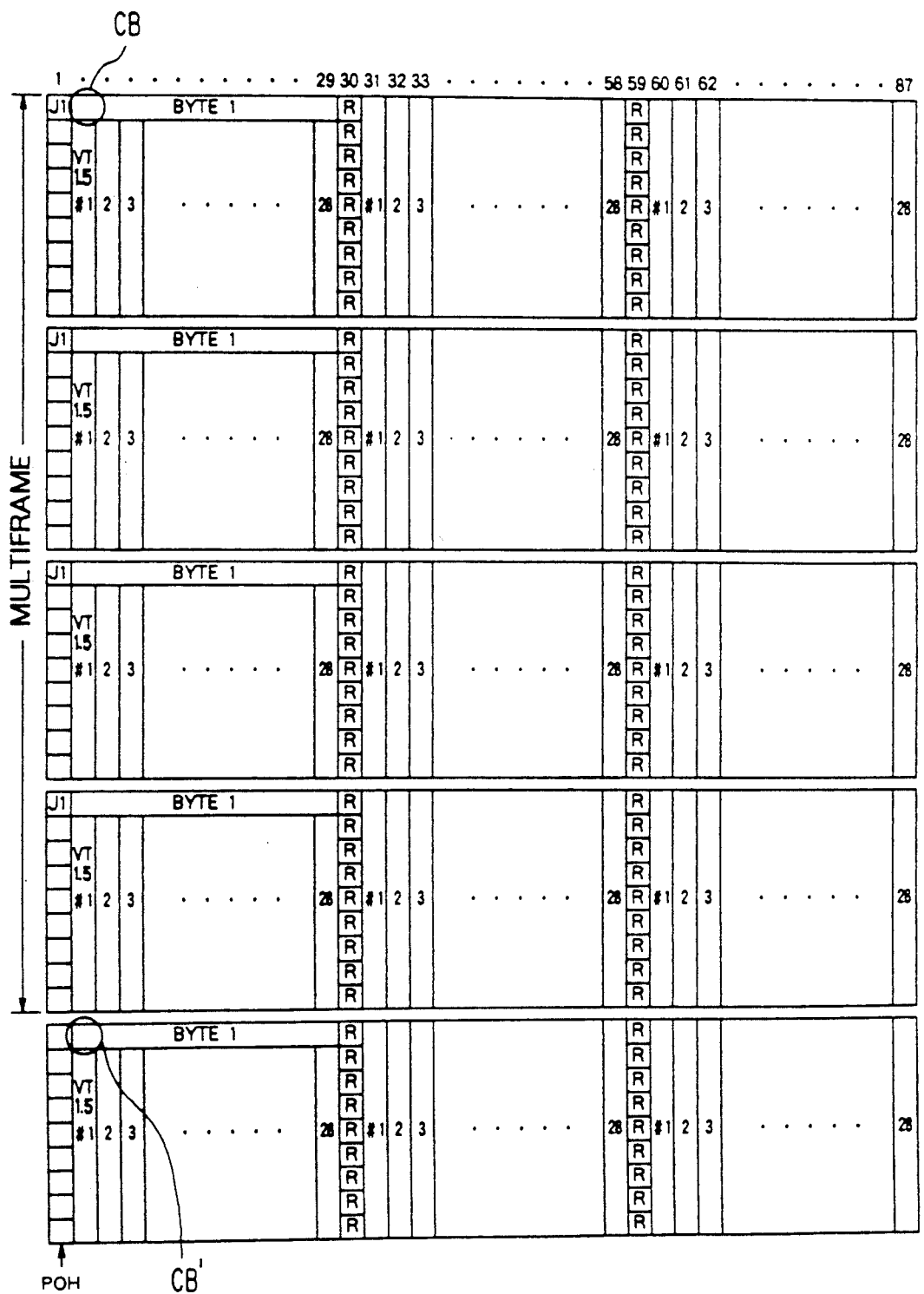
FIG. 11 is a diagram for use in describing structure of a multiframe in the STS-1 signal.

It will be supposed that each of the first through the third STS-1 signals comprises a leading multiframe comprising a prescribed plural number M of frames, each frame comprising the synchronous payload envelope. The prescribed plural number M is typically 4. The multiframe of the STS-1 signal is shown in FIG. 11 when M is 4.

In FIG. 1, the clock pulse generator 22 successively generates the clock pulses for each of the synchronous payload envelopes of the frames of the leading multiframes of the first through the third STS-1 signals. The leading byte indication signal generator 23 generates the leading byte indication signal for each of the synchronous payload envelopes of the frames of the leading multiframes of the first through the third STS-1 signals.

The channel counter 24 repeatedly produces the channel count signal for each of the synchronous payload envelopes of the frames of the leading multiframes of the first through the third STS-1 signals. The data processor 25 successively produces the control bytes for each of the synchronous payload envelopes of the frames of the leading multiframes of the first through the third STS-1 signals.

The distributor 27 repeatedly carries out the distributing operation for each of the synchronous payload envelopes of the frames of the leading multiframes of the first through the third STS-1 signals to thereby make the first through the third first-in first-out memories 26-1 to 26-3 memorize the control bytes as the first through the third memorized data signals, respectively, for each of the synchronous payload envelopes of the frames of the leading multi-frames of the first through the third STS-1 signals.

It will also be supposed that each of the first through the third STS-1 signals further comprises a following multiframe which follows the leading multiframe and which comprises a prescribed plural number M of the frames.

In this event, the clock pulse generator 22 successively generates the clock pulses for each of the synchronous payload envelopes of the frames of the following multiframes of the first through the third STS-1 signals. The leading byte indication signal generator 25 generates the leading byte indication signal for each of the synchronous payload envelopes of the frames of the following multiframes of the first through the third STS-1 signals.

The channel counter 24 repeatedly produces the channel count signal for each of the synchronous payload envelopes of the frames of the following multi-frames of the first through the third STS-1 signals.

A selector 28 is connected to the first through the third first-in first-out memories 26-1 to 26-3 and the channel counter 24. In response to the channel count signal repeatedly produced by the channel counter 24 for each of the synchronous payload envelopes of the frames of the following multiframe of the first through the third STS-1 signals, the selector 28 repeatedly carries out a selecting operation of selecting, as the processed signal 21, the first through the third memorized data signals produced at every one byte from the first through the third first-in first-out memories 26-1 to 26-3 corresponding to the first through the third channel numbers successively represented by the channel count signal for each of the synchronous payload envelopes of the frames of the following multiframes of the first through the third STS-1 signals.

The data processor 25 is further connected to the selector 28. The data processor 25 successively processes the control information data of the control bytes into processed information data on the basis of the processed signal 21 at every one byte for each of the synchronous payload envelopes of the frames of the following multiframe of the first through the third STS-1 signals. In FIG. 11, the data processor 25 processes the control information data of the control byte $CB^7$ on the basis of the control information data of the control byte CB.

The distributor 27 repeatedly carries out the distributing operation for each of the synchronous payload envelopes of the frames of the following multiframes of the first through the third STS-1 signals to thereby make the first through the third first-in first-out memories 26-1 to 26-3 memorize the processed information data as the first through the third memorized data signals, respectively, for each of the synchronous payload envelopes of the frames of the following multiframes of the first through the third STS-1 signals.

An alarm and data processing circuit 29 carries out a predetermined processing of the processed signal 21 on the basis of the channel count signal.

Figure 12:
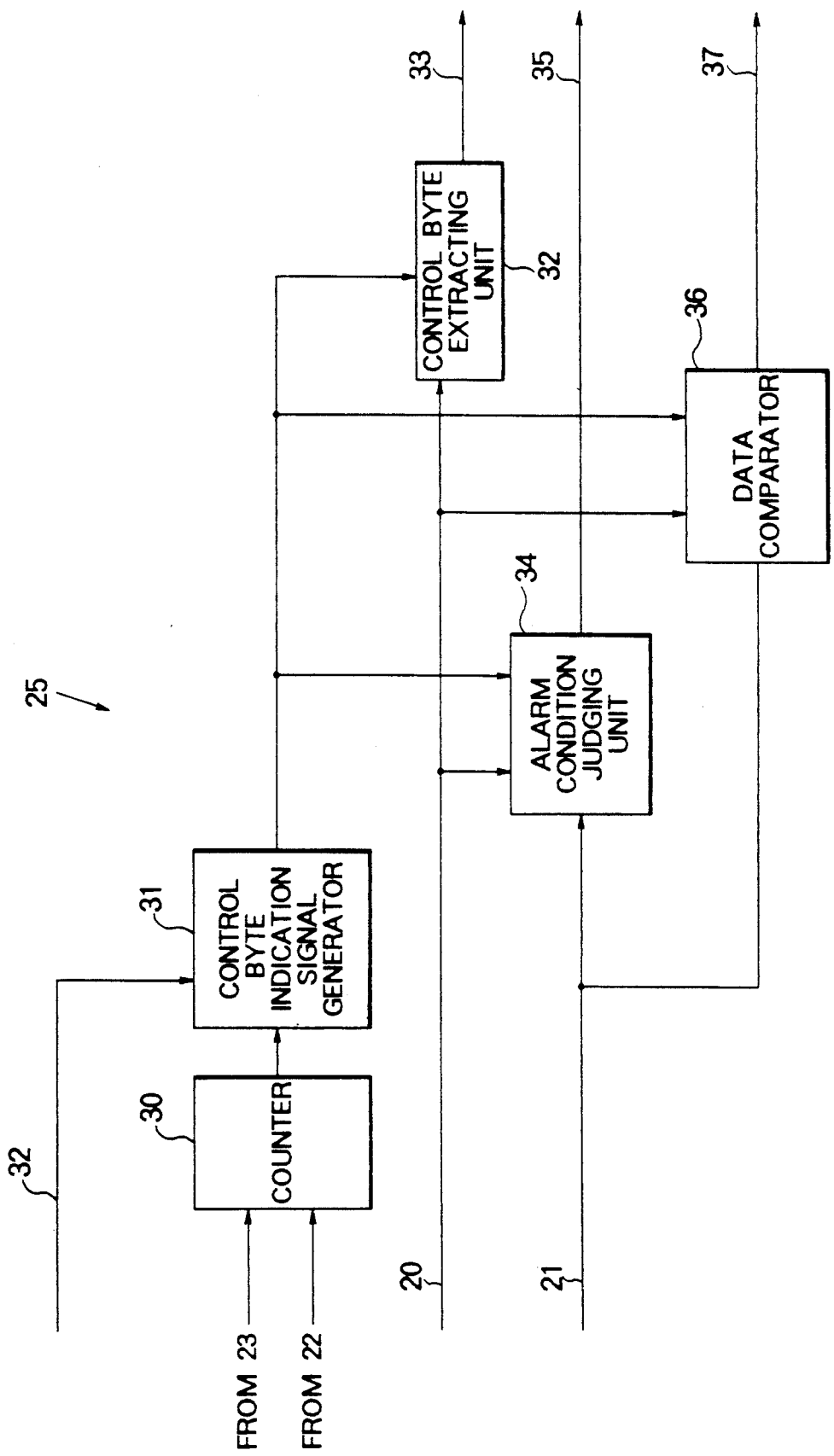
FIG. 12 is a block diagram of a data processor included in the terminating device illustrated in FIG. 1.

Turning to FIG. 12, the data processor 25 comprises a counter 30 connected to the clock pulse generator 22 and leading byte indication signal generator 23. The counter 30 is similar in structure and in operation to the channel counter 24. A control byte indication signal generator 31 is connected to the counter 30 and given a byte number signal 32 representative of the predetermined plural number J. The control byte indication signal generator 31 produces a control byte indication signal for collectively indicating the control bytes of the synchronous payload envelopes of the first through the third STS-1 signals.

A control byte extracting unit 32 is connected to the control byte indication signal generator 31 and supplied with the STS-3 signal 20. The control byte extracting unit 32 extracts the control bytes from the STS-3 signal 20 with reference to the control byte indication signal and produces the extracted control bytes 33.

Connected to the control byte indication signal generator 31 and supplied with the STS-3 signal 20 and with the processed signal 21, an alarm condition judging unit 34 extracts the control bytes from the STS-3 signal 20 with reference to the control byte indication signal and carries out alarm judgement in connection with the control information data of the extracted control bytes and with the processed signal 21 to produce an alarm information data 35. For example, the alarm condition judging unit 34 judges whether or not the alarm indication signal is present in either the control information data of the extracted control bytes or the processed signal 21. Furthermore, the alarm condition judging unit 34 judges whether or not a data error is present in either the control information data of the extracted control bytes or the processed signal 21. The alarm condition judging unit 34 thereby produces a judgement result.

A data comparator 36 is connected to the control byte indication signal generator 31 and supplied with the STS-3 signal 20 and with the processed signal 21. The data comparator 36 extracts the control bytes from the STS-3 signal 20 with reference to the control byte indication signal and compares the control information data of the extracted control bytes with the processed signal 21 to produced a comparison result 37 representative of coincidence or non-coincidence.

A combination of the extracted control bytes 33, the alarm information data 35, and the comparison results 37 is memorized in one of the first-in first-out memories 26-1 to 26-3 by the distributor 27.

What is claimed is:

1. A terminating device for carrying out a terminating processing of an STS-N signal which is a multiplexed signal given by synchronously time division multiplexing first through N-th STS-1 signals at every one byte, where N represents a predetermined integer greater than one, said first through said N-th STS-1 signals being identified by first through N-th channel numbers, respectively, each of said first through said N-th STS-1 signals comprising a synchronous payload envelope comprising a leading byte representative of predetermined data and a predetermined plural number J of control bytes following said leading byte and representing control information data used in said device in carrying out said terminating processing, said device comprising:

a clock pulse generator supplied with said STS-N signal for successively generating clock pulses in byte synchronism with the leading bytes of the synchronous payload envelopes of said first through said N-th STS-1 signals and the control bytes of the synchronous payload envelopes of said first through said N-th STS-1 signals;

a leading byte indication signal generator supplied with said STS-N signal for generating a leading byte indication signal for collectively indicating said leading bytes of the synchronous payload envelopes or said first through said N-th STS-1 signals by detecting said predetermined data of the leading bytes of the synchronous payload envelopes of said first through said N-th STS-1 signals from said STS-N signal;

a channel counter connected to said clock pulse generator and said leading byte indication signal generator for carrying out a counting operation of counting up a count from a first counted value to an N-th counted value in response to the clock pulses received while said channel counter receives said leading byte indication signal, said channel counter repeatedly carrying out said counting operation of counting up said count from said first counted value to said N-th counted value in response to the clock pulses received when said channel counter does not receive said leading byte indication signal, said channel counter repeatedly producing a channel count signal successively representing, as said first through said N-th channel numbers, said first through said N-th counted values which are counted in response to the clock pulses received when said channel counter does not receive said leading byte indication signal;

a data processor supplied with said STS-N signal and connected to said clock pulse counter and said leading byte indication signal generator for successively producing the control bytes of the synchronous payload envelopes of said first through said N-th STS-1 signals in response to the clock pulses received when said data processor does not receive said leading byte indication signal;

first through N-th first-in first-out memories which are in one-to-one correspondence to said first through said N-th channel numbers; and a distributor connected to said data processor and said first through said N-th first-in first-out memories for repeatedly carrying out, in response to said channel count signal repeatedly produced by said channel counter, a distributing operation of distributing the control bytes of the synchronous payload envelopes of said first through said N-th STS-1 signals at every one byte to the first through the N-th first-in first-out memories corresponding to said first through said N-th channel numbers successively represented by said channel count signal, said distributor thereby making said first through said N-th first-in first-out memories memorize the control bytes of the synchronous payload envelopes of said first through said N-th STS-1 signals as first through N-th memorized data signals of said first through said N-th STS-1 signals, respectively.

2. A terminating device as claimed in claim 1, each of said first through said N-th STS-1 signals comprising a leading multiframe comprising a prescribed plural number M of frames, each frame comprising said synchronous payload envelope, wherein:

said clock pulse generator successively generates said clock pulses for each of the synchronous payload envelopes of the frames of the leading multiframes of said first through said N-th STS-1 signals;

said leading byte indication signal generator generating said leading byte indication signal for each of the synchronous payload envelopes of the frames of the leading multiframes of said first through said N-th STS-1 signals;

said channel counter repeatedly producing said channel count signal for each of the synchronous payload envelopes of the frames of the leading multiframes of said first through said N-th STS-1 signals;

said data processor successively producing the control bytes for each of the synchronous payload envelopes of the frames of the leading multiframes of said first through said N-th STS-1 signals; and said distributor repeatedly carrying out said distributing operation for each of the synchronous payload envelopes of the frames of the leading multiframes of said first through said N-th STS-1 signals to thereby make said first through said N-th first-in first-out memories memorize the control bytes as said first through said N-th memorized data signals, respectively, for each of the synchronous payload envelopes of the frames of the leading multiframes of said first through said N-th STS-1 signals.

3. A terminating device as claimed in claim 2, said terminating device being for carrying out said terminating processing to produce a processed signal, each of said first through said N-th STS-1 signals further comprising a following multiframe which follows said leading multiframe and which comprises said prescribed plural number M of frames, each frame comprising said synchronous payload envelope, wherein:

said clock pulse generator successively generates said clock pulses for each of the synchronous payload envelopes of the frames of the following multiframes of said first through said N-th STS-1 signals;

said leading byte indication signal generator generating said leading byte indication signal for each of the synchronous payload envelopes of the frames of the following multiframes of said first through said N-th STS-1 signals;

said channel counter repeatedly producing said channel count signal for each of the synchronous payload envelopes of the frames of the following multiframes said first through said N-th STS-1 signals; and said device further comprising:

a selector connected to said first through said N-th first-in first-out memories and said channel counter for repeatedly carrying out in response to said channel count signal repeatedly produced by said channel counter for each of the synchronous payload envelopes of the frames of the following multiframes of said first through said N-th STS-1 signals, a selecting operation of selecting, as said processed signals, said first through said N-th memorized data signals produced at every one byte from said first through said N-th first-in first-out memories corresponding to said first through said N-th channel numbers successively represented by said channel count signal for each of the synchronous payload envelopes of the frames of the following multiframes of said first through said N-th STS-1 signals.

4. A terminating device as claimed in claim 3, wherein:

said data processor further connected to said selector for successively processing the control information data of the control bytes into processed information data on the basis of said processed signal at every one byte for each of the synchronous payload envelopes of said following multiframe of said first through said N-th STS-1 signals;

said distributor repeatedly carrying out said distributing operation for each of the synchronous payload envelopes of the frames of the following multiframes of said first through said N-th STS-1 signals to thereby make said first through said N-th first-in first-out memories memorize the processed information data as said first through said N-th memorized data signals, respectively, for each of the synchronous payload envelopes of the frames of the following multiframes of said first through said N-th STS-1 signals.

* * * * *

UNITED STATES PATENT AND TRADEMARK OFFICE
CERTIFICATE OF CORRECTION

PATENT NO. :   5,309,441
DATED      :   May 3, 1994
INVENTOR(S):   Yoshihide KURODA It is certified that error appears in the above-identified patent and that said Letters Patent is hereby corrected as shown below:

Col. 1, line 64, delete "contact" and insert --control--.

Signed and Sealed this

Twenty-second Day of November, 1994

Attest:

BRUCE LEHMAN

Attesting Officer

Commissioner of Patents and Trademarks